Sheet 1 - 2 Sheets.
J. Robertson,
Cotton Press,
№ 82,036. Patented Sept. 8, 1868.
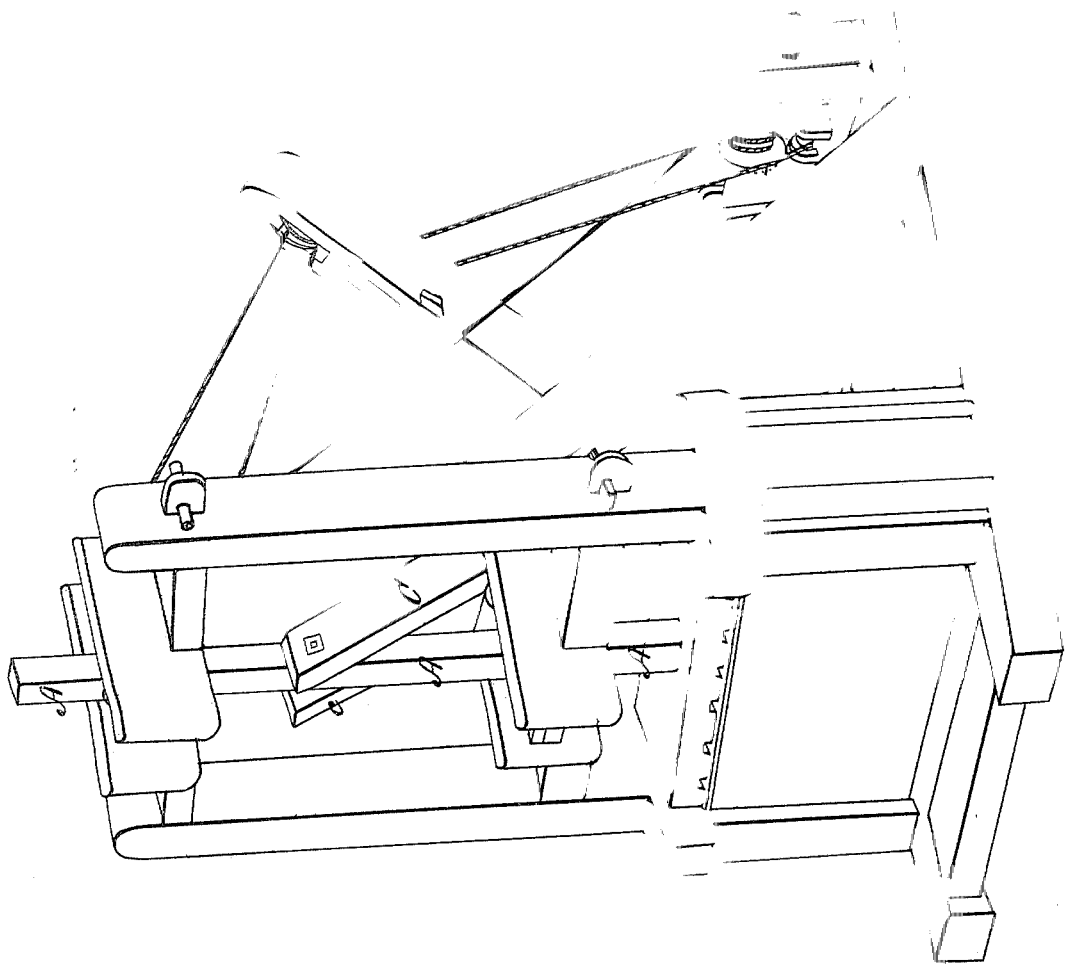
Witnesses;
Chas. F. Clausen
R. H. Eagle
Inventor;
Robertson
Hollaway & Co
attys

United States Patent Office.

JAMES ROBERTSON, OF GOSPORT, INDIANA.

Letters Patent No. 82,036, dated September 8, 1868.

IMPROVED HAY AND COTTON-PRESS.

*The Schedule referred to in these Letters Patent and making part of the same.*

TO ALL WHOM IT MAY CONCERN:

Be it known that I, JAMES ROBERTSON, of Gosport, in the county of Owen, in the State of Indiana, have invented a new and improved Mode of Pressing Hay and Cotton; and I do hereby declare that the following is a full, clear, and exact description of the construction and operation of the same, reference being had to the annexed drawings, and to the letters of reference marked thereon.

The nature of my invention consists in providing a machine for pressing hay and cotton.

To enable others skilled in the art to make and use my invention, I will proceed to describe its construction and operation.

A is a vertical shaft, playing between four rollers, B B B B, which vertical shaft has attached to it two tug-levers, C C, connected to a lever, D, at J.

Lever D is connected to fulcrum E. To said lever are two tackles, one of which is to raise, the other to depress the lever. One tackle passes around two rollers, E E, and fastens to a cylinder, G. The other tackle passes around roller H, then around a snatch-wheel, I, and fastens to cylinder G.

The hay or cotton being placed in a frame at the foot of the vertical shaft A, is pressed by power applied to the crank of cylinder G. When pressed, a backward motion of the crank elevates the lever D and the shaft A, releasing the bale.

Said hay and cotton-press may be worked by hand, horse, steam, or water-power.

What I claim as my invention, and desire to secure by Letters Patent, is—

The combination of the press-beam A, rollers B B, connecting-beam C C, lever D, winch and axle G, and rope connecting the axle, the lever D, and the beam A, said parts being arranged, in relation to one another, substantially as described.

JAMES ROBERTSON.

Witnesses:
J. M. CARLTON,
J. C. DUNCAN.

United States Patent Office.

JAMES ROBERTSON, OF GOSPORT, INDIANA.

Letters Patent No. 82,036, dated September 8, 1868.

IMPROVED HAY AND COTTON-PRESS.

*The Schedule referred to in these Letters Patent and making part of the same.*

TO ALL WHOM IT MAY CONCERN:

Be it known that I, JAMES ROBERTSON, of Gosport, in the county of Owen, in the State of Indiana, have invented a new and improved Mode of Pressing Hay and Cotton; and I do hereby declare that the following is a full, clear, and exact description of the construction and operation of the same, reference being had to the annexed drawings, and to the letters of reference marked thereon.

The nature of my invention consists in providing a machine for pressing hay and cotton.

To enable others skilled in the art to make and use my invention, I will proceed to describe its construction and operation.

A is a vertical shaft, playing between four rollers, B B B B, which vertical shaft has attached to it two tug-levers, C C, connected to a lever, D, at J.

Lever D is connected to fulcrum E. To said lever are two tackles, one of which is to raise, the other to depress the lever. One tackle passes around two rollers, E E, and fastens to a cylinder, G. The other tackle passes around roller H, then around a snatch-wheel, I, and fastens to cylinder G.

The hay or cotton being placed in a frame at the foot of the vertical shaft A, is pressed by power applied to the crank of cylinder G. When pressed, a backward motion of the crank elevates the lever D and the shaft A, releasing the bale.

Said hay and cotton-press may be worked by hand, horse, steam, or water-power.

What I claim as my invention, and desire to secure by Letters Patent, is—

The combination of the press-beam A, rollers B B, connecting-beam C C, lever D, winch and axle G, and rope connecting the axle, the lever D, and the beam A, said parts being arranged, in relation to one another, substantially as described.

JAMES ROBERTSON.

Witnesses:
J. M. CARLTON,
J. C. DUNCAN.